United States Patent [19]

Adams

[11] 3,728,595

[45] Apr. 17, 1973

[54] FEEDRATE CONTROL SYSTEM FOR MILLING MACHINES

[75] Inventor: Lyle C. Adams, Seattle, Wash.

[73] Assignee: The Boeing Company, Seattle, Wash.

[22] Filed: Feb. 27, 1970

[21] Appl. No.: 14,918

[52] U.S. Cl. .....................318/39, 90/13.5, 318/571
[51] Int. Cl. ..............................................G05b 19/24
[58] Field of Search...............................318/39, 571; 90/13.5

[56] References Cited

UNITED STATES PATENTS

| | | |
|---|---|---|
| 3,259,023 | 7/1966 | Rieger et al. ..........................90/13.5 |
| 3,545,310 | 12/1970 | Porath et al. ........................318/39 X |
| 3,418,549 | 12/1968 | Emerson et al....................318/571 X |
| 3,389,313 | 6/1968 | Reynolds..............................318/39 |
| 3,325,710 | 6/1967 | Reynolds..............................318/39 |
| 3,573,588 | 4/1971 | Geyer et al. ..........................318/571 |

Primary Examiner—Benjamin Dobeck
Attorney—Christensen, Sanborn & Matthews

[57] ABSTRACT

A system for automatically controlling the feedrate of a milling machine includes a sensor which measures the actual milling force exerted on the cutting element thereof during the milling process. If the actual milling force exceeds a pre-set reference force, a controller supplies a control signal to the feedrate control circuits within the milling machine to appropriately modify the feedrate. A sensor housing for cutter drawbar machines includes a spindle adapter which is interposed between the spindle and cutting element and which has disposed thereon a plurality of strain gauges disposed in a bridge arrangement. The outputs of the bridges correspond to either spindle deflection or spindle torque. The controller may include an integral control function which operates on an error signal obtained from the comparison of the pre-set reference and the actual milling forces.

9 Claims, 8 Drawing Figures

INVENTOR.
LYLE C. ADAMS
BY Christensen, Sanborn & Matthews
ATTORNEYS

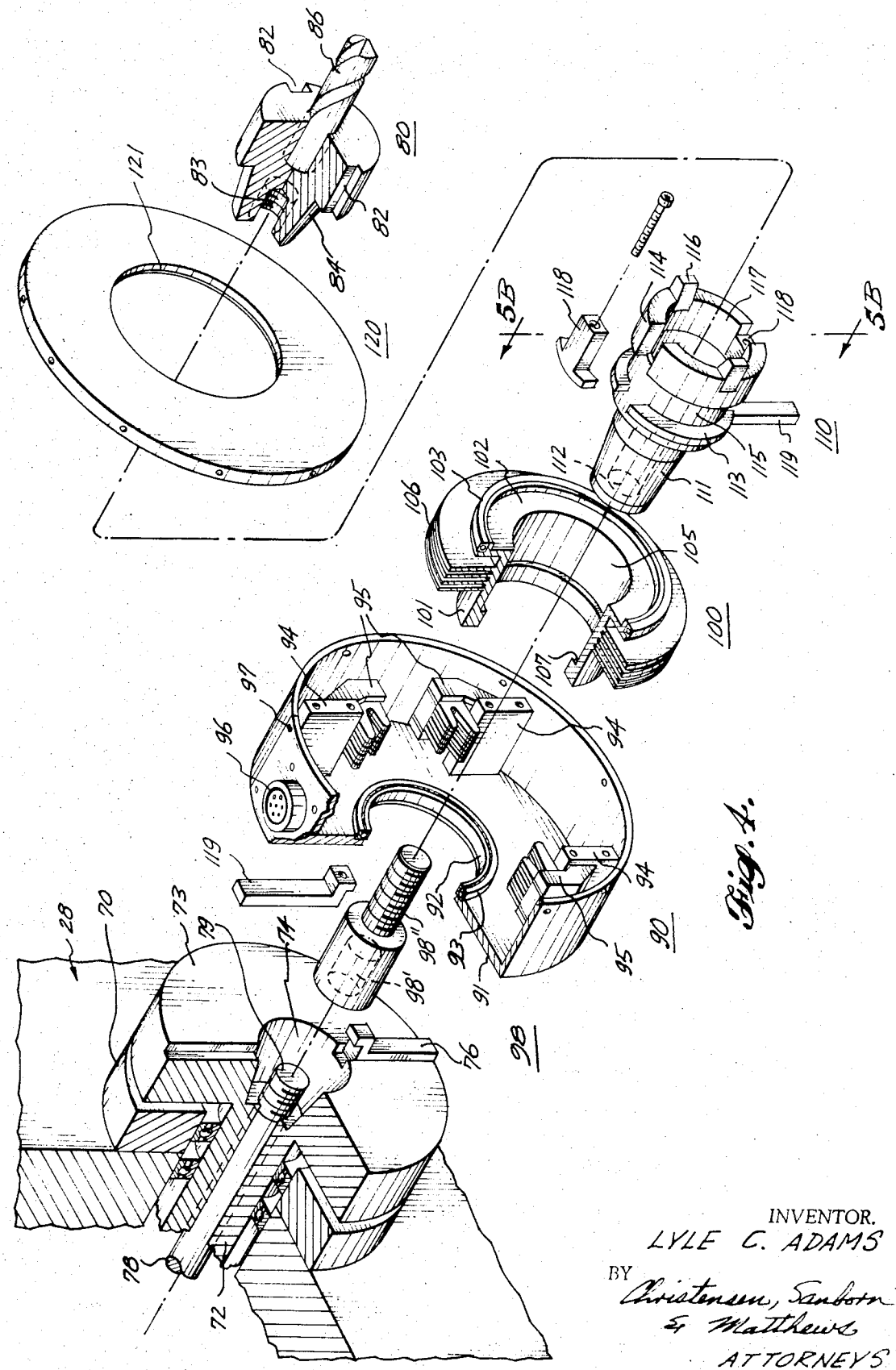

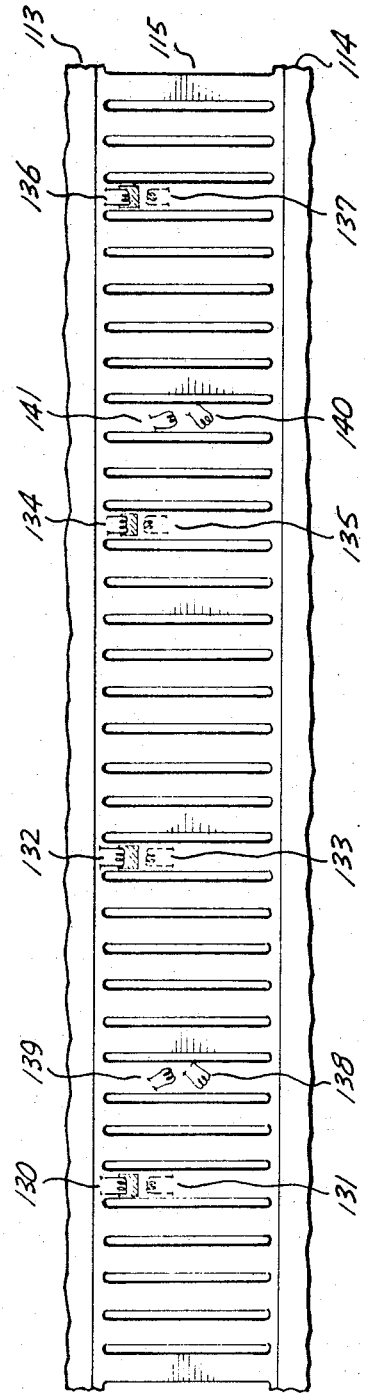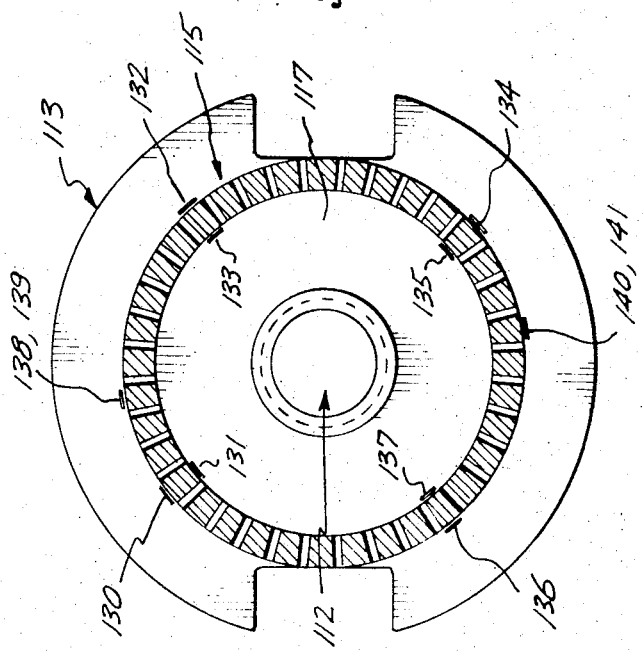

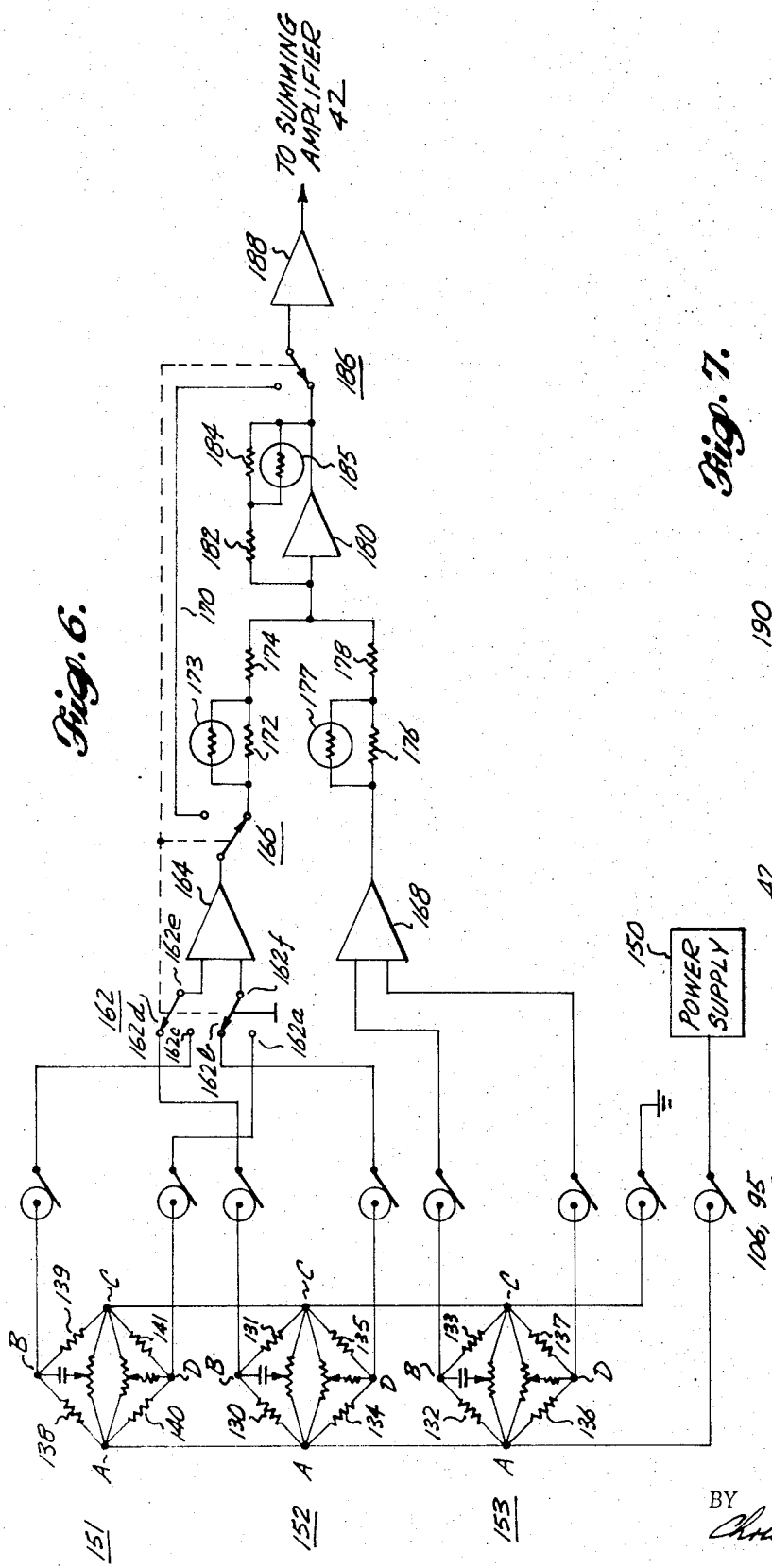
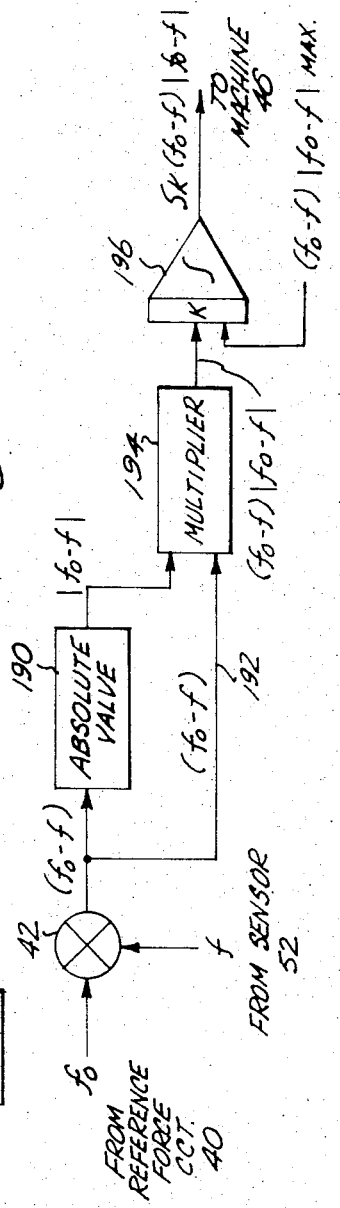

FEEDRATE CONTROL SYSTEM FOR MILLING MACHINES

BACKGROUND OF THE INVENTION

This invention generally relates to feedback control systems and, more particularly, to a system automatically controlling the feedrate of a milling machine.

In a machine tool such as a milling machine, metal removal is normally accomplished by rotating a cutting tool at a predetermined rate against a workpiece that is moved at a predetermined feedrate relative to the cutting tool. With particular reference to FIG. 1, a milling machine 10 of the conventional horizontal bed-mill type includes a longitudinal base 12 upon which are disposed two rails 14. A milling table 16 supports a workpiece 18 and is moved in a longitudinal or x-direction along rails 14 by a suitable table motor and gears, not shown, which are housed in a casing 20. Disposed at a right angle to the rails 14 are a pair of rails 22 which may be supported by casing 20. A second table 24 is disposed on rails 22 and is moved in a vertical or y-direction by a second motor and gear arrangement disposed in housing 20. In turn, table 24 has a pair of rails 26 mounted thereon. A cutter mechanism 28 is disposed on rails 26 and is moved in a transverse or z-direction by a third motor and gear arrangement, preferably within cutter mechanism 28. Mechanism 28 also houses a fourth motor and gear arrangement which rotates a spindle extending in the z-direction and terminating through various adapters, in a cutting tool 30 which is brought into engagement with the workpiece 18 during the milling process. With this machine, feedrate can be defined as the rate of movement of the workpiece 18 relative to cutting tool 30 in any of the three coordinate directions, as by movement of tables 16 or 24 or cutter mechanism 28.

In the past, standard milling practice has dictated that the machine operator select or maintain a feedrate of the workpiece relative to the cutting tool that is a compromise between the need for maximum metal removal from the workpiece, in the shortest possible time, and avoidance of undue cutter breakage or wear. In such cases, the operator would depend on his own experience and caution in setting the feedrate. With the advent of numerically controlled milling machines, the operations of the various table and spindle mechanisms are under direct control of a digital computer which receives its input from a data source, such as a punched paper tape or a magnetic tape. Although knowledge of the milling process had advanced to a point where these systems control most aspects thereof, the relationship between cutter breakage and wear and maximum metal removal from the workpiece has not been completely understood. Accordingly, the selection of feedrate for a particular operation, with particular metals, is still largely determined from the experience and caution of the operator. With these systems, a desired feedrate is pre-set into the numerical control unit by the operator either manually or by means of the pre-programmed input tape. In addition, a manual override circuit is usually provided which includes an operator-controlled potentiometer. When a situation of potential undue wear or stress is encountered, the operator can manipulate this control to reduce the pre-set feedrate.

Although feedrate selection by the machine operator does minimize cutter breakage and wear, this selection has often proved to be very conservative with respect to an optimum balance between those factors and maximum machine productivity. Since milling machines are generally very expensive devices to purchase and to operate, every increase of productivity thereof is desirable. Recognizing this problem, many experimenters have devised automatic control systems for feedrate. For the most part, these systems have been integrated with the numerical control circuitry and have determined an optimum feedrate from a plurality of parameters of the machining process. For example, one approach has been to measure the spindle axial load by hydraulic means connected thereto, and to provide an appropriate step reduction in the feedrate when that load exceeds a predetermined minimum. Another approach found in many prior devices has been to sense the torque output and speed of the electric motor which drives either the feed table or the spindle, and to modify the pre-set feedrate in proportion thereto. Still another approach has been to measure, by means of suitable sensors, the deflection of the cutting tool and the torque exerted thereon by engagement by the workpiece, and to accordingly control the operation of the spindle motor and the feed table motor simultaneously in proportion to a control signal obtained by combining the deflection and torque information.

Although these prior approaches do provide automatic control of feedrate, they have been very expensive to implement or have sacrificed quick reaction capability. In addition, the specific designs advanced have not been adapted or made available for use with any numerically controlled or conventional milling machine. Yet, there are many milling machines in which there has been placed large capital expenditures, whose productivity could be greatly increased by an inexpensive feedrate control system.

It is therefore an object of this invention to provide an inexpensive automatic feedrate control system which can be readily adapted to all existing milling machines having a feedrate control.

It is a further object of this invention to provide automatic control of machine feedrate by using a simple feedback control system.

It is yet a further object of this invention to provide an automatic feedrate control system which effectively reduces undue cutter breakage or wear while greatly increasing machine productivity.

SUMMARY OF THE INVENTION

These objects and others are achieved, briefly, by sensing a spindle parameter associated with the interaction between cutter and workpiece, such as force or torque, converting the sensed parameter into a milling force signal, then comparing the milling force signal with a reference force signal to appropriately modify the feedrate when a reference force is exceeded.

BRIEF DESCRIPTION OF THE DRAWINGS

The subject matter of this invention is particularly pointed out and distinctly claimed in the concluding portion of the specification. The invention, both as to organization and method of operation, may best be understood by reference to the following description taken in conjunction with the accompanying drawings in which:

FIG. 4 is an exploded pictorial diagram showing the structure and assembly of a sensor used to detect variations in spindle deflection or torque;

FIGS. 5A and 5B are plan and section views, respectively, of an arrangement of strain gauges used in the sensor of FIG. 4;

FIG. 6 is a schematic diagram of the sensor circuit; and

FIG. 7 is a block diagram of a typical feedrate controller.

DESCRIPTION OF A PREFERRED EMBODIMENT

Figure 1:
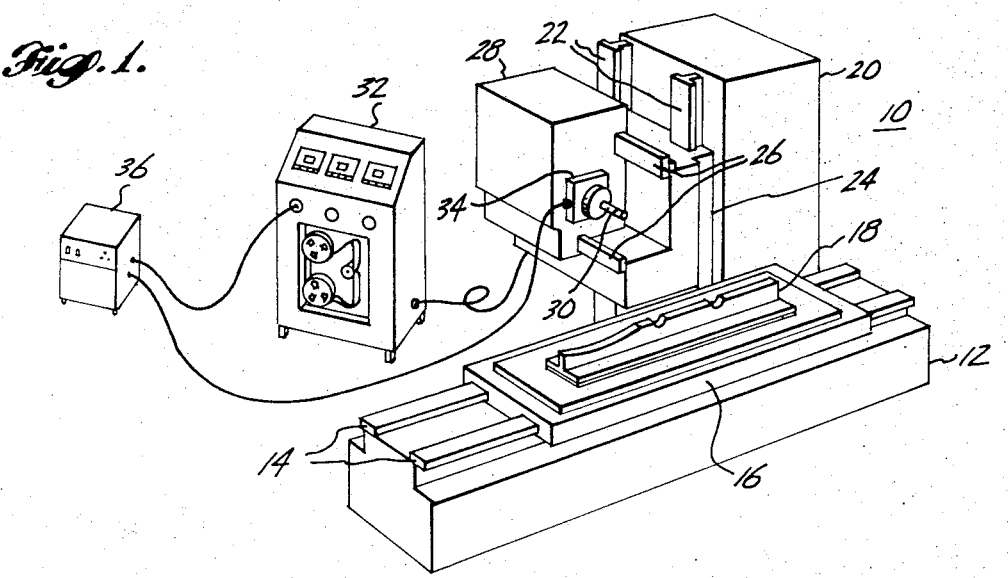
FIG. 1 is a pictorial diagram of the numerically controlled milling machine.

With reference again to FIG. 1, milling machine 10 is supplied with control signals from a numerical control or N/C unit 32. Numerical control units of this type are well-known to the art and generally comprise digital computer circuits which convert the information on a pre-programmed tape into control signals for milling machine 10. Of course, for different milling operations and for different workpieces, different pre-programmed tapes are required. Included in each tape are a plurality of instructions which define the details of a machining process necessary to produce a finished workpiece of desired dimension and tolerances. One of these instructions may include the desired feedrate in the three coordinate directions throughout the milling process.

The feedrate control system of this invention includes a sensor housing 30 which is disposed adjacent to the spindle of cutter mechanism 28. According to the teachings of this invention, feedrate may be controlled solely in response to a single milling force signal which is obtained from the sensor housing 30. The milling force signal is obtained by sensing either spindle deflection or spindle torque and is furnished to a feedrate control unit 36 which in turn supplies a control signal to the N/C unit 32.

Figure 2:
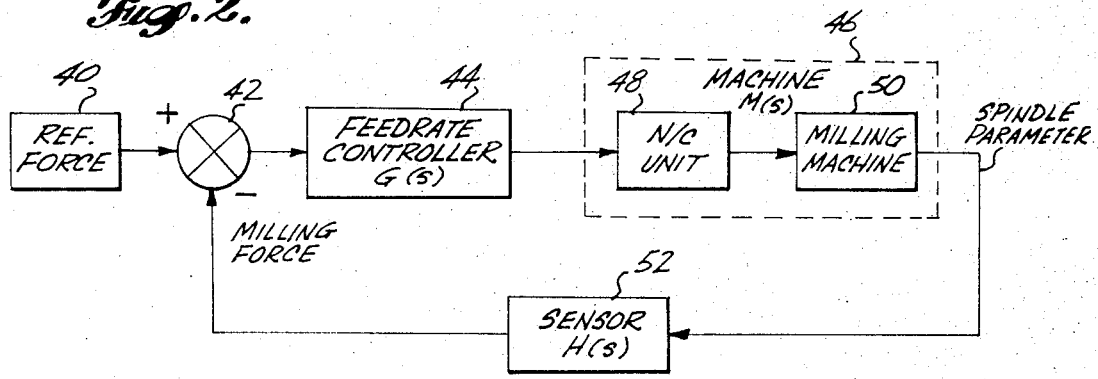
FIG. 2 is a block diagram of the feedrate control system of this invention.

Now referring to FIG. 2, the system elements are shown in conventional feedback control configuration. The desired spindle parameter is determined by a sensor circuit 52 which may be wholly or partially disposed within sensor housing 34. Sensor circuit 52 converts the spindle parameter into a proportional milling force signal. The spindle parameter may comprise either spindle deflection or torque. The milling force signal is applied to a summing junction 42 along with a reference force signal obtained from a circuit 40.

The purpose of this comparison is to obtain an error signal which is equal to the difference between a pre-set reference force and actual milling force exerted on the spindle, and thus on the cutting tool. It has been discovered that control of feedrate in accordance with only milling force significantly reduces the probability of cutter breakage and undue wear while greatly increasing productivity of the machine. In addition, milling force can be easily determined by simple apparatus and techniques which require little or no modification of existing milling machines.

Although the reference force is not a mathematically determinable parameter, a close approximation thereto can be made for any desired configuration of cutting element, any desired workpiece material, or any desired cutting operation. For simple cutting elements, this approximation is empirically made by determining what is the maximum amount of milling force that can be applied to the cutting element without breakage thereof. With these tools, the factor of undue wear is not significant. With a more complicated cutting element whose cost is a major element in the operational expenses of the machine, the factor of undue wear must also be considered, and therefore the reference force is reduced from that which would be used if the probability of cutting element breakage were the sole determining factor.

In one embodiment, circuit 40 may comprise a simple potentiometer providing an analog voltage to summing junction 42. The potentiometer may be set at the beginning of the machining process and thereafter the feedrate will be controlled in accordance with that pre-set value. Alternatively, if a plurality of different cutting operations are to be controlled by N/C unit 32, the reference forces may be pre-programmed into the N/C tape for that particular operation, along with other machining instructions including desired feedrate. In such a case, circuit 40 may comprise a portion of the tape reader and buffer circuits included in N/C unit 32.

The error signal appearing on the output of summing junction 42 is supplied to a feedrate controller 44. The elements of the feedback system, and especially controller 44, must have a dynamic response so as to limit peak cutter milling forces to a value approximating that of the reference force set by curcuit 40. In the simplest embodiment, feedrate controller 44 is constructed to coact with the presently-used override circuits of known N/C units and therefore operates to reduce the pre-set feedrate when the reference force is exceeded during the milling process. This type of control is in accordance with previous automatic feedrate controls and has proved to be the most feasible from an operating and practical standpoint. However, it is also contemplated that the feedrate controller 44 be able to increase feedrate above the pre-set value, if the reference force is in fact not exceeded during the milling process.

The output of feedrate controller 44 is supplied to a milling machine block 46 which comprises an N/C control 48 and a milling machine 50. As can be seen in more detail in FIG. 3, the output from feedrate controller 44 may be applied to an N/C feedrate control circuit 60 which is disposed with an N/C control 48. In existing numerical control units, external feedrate override is effected by the operator rotating a potentiometer shaft. With such a unit, circuit 60 may comprise a servo motor which rotates the shaft of that potentiometer in accordance with the magnitude and direction of the signal from feedrate controller 44.

The manual override potentiometer is usually disposed in a circuit which determines the clock frequency of the numerical control logic. The feedrate is determined in these units by dividing down, by appropriate logic circuitry, that clock frequency. Therefore, the potentiometer in circuit 60 may be operative to lower the clock frequency in proportion to the degree of shaft rotation. In a preferred embodiment of the system, the output signal from feedrate controller 44 may be connected into a logic circuit which directly controls the clock frequency, as by a variable frequency oscillator or the like.

The control signal from circuit 60 is fed to an N/C feedrate and spindle programmer circuit 62 which processes the instruction signals obtained from the pre-programmed N/C tape. These signals define the depth of cut, speed of spindle rotation, and the like. In most cases, the control signal from circuit 60 comprises the system clock pulses and therefore controls the rate at which the logic means in programmer 62 provides speed and direction control signals to one or more of the table motors, in correspondence with the instruction signals. The programmer 62 also supplies speed and direction control signals to the spindle motor which form no part of this feedrate control system.

The feedrate output signal from programmer 62 is supplied to a table motor and gear arrangement 64. Through appropriate mechanical linkage, the table motor and gear arrangement 64 moves a table and workpiece 66 at the desired feedrate.

Until the workpiece has actually come into contact with the cutting tool of the milling machine, the feedback loop for the feedrate control system is not completed. When contact is made between the cutting tool and the workpiece, the force exerted therebetween may be designated as milling force and the cutting tool is therefore deflected or twisted in proportion thereto. This deflection or twisting is transmitted via the spindle 68 of the milling machine to the sensor circuit 52 whose output signal is thus proportional to actual milling force.

Since the feedback loop is not completed until the cutting element engages the workpiece, the milling process may proceed at the pre-programmed feedrate until contact is made. At that time, the feedback loop is completed and the feedrate is accordingly controlled in accordance with the deviation of actual milling force from the pre-set reference force.

Figure 3:
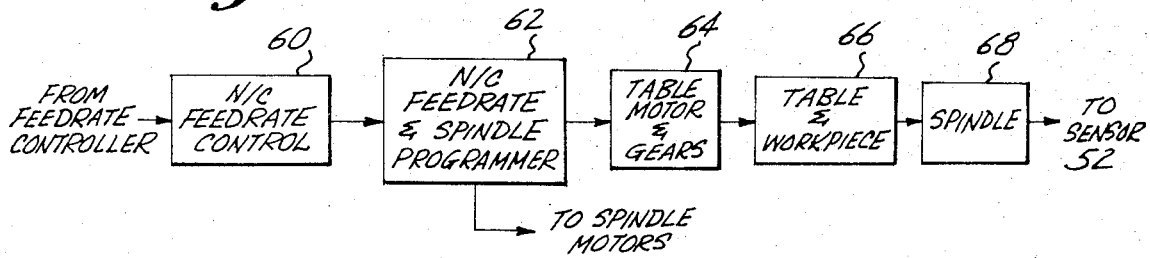
FIG. 3 is a block diagram of a portion of a typical numerically controlled milling machine.

It should be noted that the elements illustrated in FIG. 3 form no part of the instant invention, for they are constituents of commonly-known numerically controlled milling machines and are included for purposes of explanation only. The automatic feedrate control system of this invention may be used with any conventional or numerically-controlled milling machine, as long as the feedrate thereof can be adapted for external control and as long as the spindle is accessible for deflection or torque measurements.

The construction and operation of the system can perhaps be best understood by considering a specific embodiment of each element of the system in FIG. 2. It should be cautioned, however, that these embodiments are merely typical, and that the system invention is not limited thereto.

With specific reference to FIG. 4, the details of one embodiment of sensor housing 34 and sensor circuit 52 may be ascertained. The particular milling machine for which the housing is designed is of the cutter draw bar type in which a tool adapter is secured to the machine's spindle by means of a draw bar passing through the center of the spindle. In turn, the tool adapter supports a cutting tool.

More specifically, the cutter mechanism 28 includes an external bearing holder 70 which supports for rotation the end of a spindle 72 extending along the transverse or z-axis of the milling machine. Disposed at the end of spindle 72 is a relatively enlarged spindle nose portion 73 which has on a front surface thereof a plurality of removable dogs or projections 76 which are adapted to engage with corresponding recesses in a tool adapter. Also included in nose portion 73 is a centrally-located, tapered recess 74. A cutter draw bar 78 extends throughout the length of spindle 72 and has a threaded end 79 terminating within the aperture formed by recess 74.

Normally, the spindle 72, cutter draw bar 78, and the enlarged spindle nose 73 are adapted to receive a tool adapter such as illustrated at 80 which includes a tapered projection 84 designed to co-fit with tapered recess 74, a plurality of recesses 82 adapted to be engaged by projections 76, and a centrally-located aperture 83 which is adapted to be threadedly engaged with end 79 of cutter draw bar 78. In turn, tool adapter 80 has any desired cutting tool 86 located in an outside face thereof.

As is well known, such tool adapters are provided to accommodate fast and accurate cutting tool changes without necessity for realignment or other adjustments to the milling machine. The tapers on recess 74 and projection 84 are equivalent and may comprise, for example, a standard No. 50 machine taper. When a tool is to be attached to the spindle, it is first inserted into the tool adapter. The tool adapter is then placed into contact with spindle nose portion 73 and the cutter draw bar 78 threaded therein. After tightening, the co-fitting of tapers 74 and 84 provide precise alignment of the cutting tool, and the co-fitting of projections 73 and recesses 82 provide a positive drive to the cutting tool during spindle rotation.

The sensor illustrated in FIG. 4 allows the interchangeability of the tool adapter and cutter draw bar combination to be retained in existing milling machines of this type, and is readily mounted on the machine without any modification whatsoever to the physical structure. Milling force exerted on the cutter by the workpiece is determined by measuring either spindle deflection or torque. A plurality of strain gauges are disposed in a spindle adapter unit which is interposed between the spindle nose 73 and the tool adapter 80. By connecting these strain gauges in an electrical bridge to which a regulated power supply is connected, any unbalance due to deflection and/or torque can be used to develop an output signal proportional to milling force.

The sensor housing 34 comprises a slip-ring stator within a casing 90, a slip-ring rotor 100, a spindle adapter unit 110, a casing cover 120, and a cutter draw bar extension 98. A plurality of strain gauges are disposed on spindle adapter 110, as illustrated in FIGS. 5A and 5B. Electrical connections are made from the strain gauges on adapter 110 to the slip-ring rotor 100 which slidably engages, in assembly, the corresponding slip-ring stator disposed in casing 90. Electrical connection is then made from the slip-ring stator to the remaining elements of sensor circuit 52. Cutter draw bar extension 98 and spindle adapter 110 merely extend the draw bar 78 and spindle nose 73 to the front face of casing 90 so that the quick-change interchangeability of the cutter draw bar and tool adapter arrangement is retained.

In more detail, casing 90 has a face 91 which is placed in proximity to spindle nose 73. Suitable means, not illustrated, maintain face 91 a given clearance from the face of spindle nose 73 and in addition prevent the rotation of casing 90. For example, such a means could comprise a simple pin-and-recess arrangement between face 91 and spindle mechanism 28.

There is defined in face 91 a circular aperture 92 which is somewhat larger than the largest diameter of taper 74. A sealing means 93 is disposed along the periphery of aperture 92 and accordingly acts as a bearing surface for slip-ring rotor 100. Rotor 100 includes a cylindrical portion 101 engaging sealing means 93. Disposed on the surface of portion 101 are a plurality of slip rings 106 which in assembly contact a plurality of slip rings 95 maintained in casing 90 by a corresponding plurality of supporting means 94.

An aperture 105 is defined within portion 101. Spindle adapter 110 is press-fit into aperture 105 until a circumferential shoulder 113 thereof engages a corresponding shoulder 107 of portion 101. Adapter 110 includes a taper projection 111 which has the same machine taper as taper 74 of the spindle nose 73. Taper projection 111 has a centrally-located aperture 112 which permits passage of cutter draw bar extension 98 therethrough.

A cylindrical surface 114 on adapter 110 is separated from shoulder 113 by a reduced-diameter, cylindrical surface 115. A partially-tapered aperture 117 is defined in adapter 110 which communicates with aperture 112 within tapered portion 111 thereof. Aperture 117 also has a machine taper corresponding to that of taper 74. A plurality of projections 116 are provided on the front of adapter 110 which are configured to engage the corresponding recesses 82 of tool adapter 80 in assembly. A positive drive and retaining connection between the spindle adapter 110 and spindle nose portion 73 is afforded by a plurality of dogs or projections 119 which replace removable dogs or projections 76 in spindle nose portion 73. Projections 119 are secured to shoulder 113 by a corresponding plurality of clamping means 118.

The sensor housing 34 presents a tool-engaging face to adapter 80 which is equivalent to that previously presented by spindle nose portion 73. To assemble the housing 34, spindle adapter 110 is first press-fit into slip-ring rotor 100 which has been previously assembled with casing 90. In assembly, shoulder 113 extends beyond face 91 of casing 90. The assembly is completed by fastening cover 120 to casing 90. Included therein is a circular aperture 121 which rotatably engages enlarged-diameter, cylindrical portion 102 in corresponding sealing means 103 of slip-ring rotor 100.

To mount the sensor housing 34 on the milling machine, the cutter draw bar extension 98 is first attached to the cutter draw bar by threading a first recess 98' upon part of the end 79 thereof. Sensor housing 34 is then placed over cutter draw bar extension 98 which passes through apertures 112 and 117 of spindle adapter 110. A fastener passed through clamping means 118 secures projections 119 to shoulder 113.

Thereafter, the tool adapter may be placed into contact with the spindle adapter 110 and the cutter draw bar extension, including threaded portion 98", threaded therein. After tightening, the co-fitting of tapers 117 and 84 provide precise alignment of the cutting tool, and the co-fitting of projections 116 and recesses 82 provide a positive drive to the cutting tool during spindle rotation. In turn, the tool adapter 80, and thus the cutting tool 86, is directly mechanically coupled to the machine spindle 72. Accordingly, the deflection of and torque exerted on adapter 110 are representative of the milling force experienced by cutting tool 86 when contact with a workpiece is made. Measurement of deflection and torque is made by a plurality of strain gauges disposed on reduced-diameter, cylindrical surface 115. These strain gauges are connected in a bridge configuration. Electrical connections for power and for output signals are made between the bridges and slip rings 106. The electrical circuitry is completed by mechanical contact between slip rings 106 and slip rings 95, and by electrical connections between slip rings 95 and an output connector 96 disposed in casing 90.

The placement of these strain gauges is best illustrated in FIGS. 5A and 5B. FIG. 5B is a section view of adapter 110 taken along the lines indicated in FIG. 4, and FIG. 5A is a laid-out plan view of the surface 115. To measure deflection of the cutter 86, and thus of spindle adapter 110, two sets of four strain gauges apiece are placed in quadrature relationship on adapter 110. Specifically, strain gauges 130, 131, 134 and 135 are disposed along a first diameter of adapter 110 to measure spindle deflection along that diameter. Strain gauges 130 and 134 are disposed on the surface 115, and strain gauges 131 and 135 are disposed in proximity thereto on the inner surface defining aperture 117. In like manner, strain gauges 132, 133, 136 and 137 are disposed along a second diameter which is at a right angle to the first diameter to measure spindle deflection along that diameter. Finally, strain gauges 138 and 139, and 140 and 141 are disposed along yet a third diameter of adapter 110 and are operative to measure the torque exerted thereon. Strain gauges 138 and 139 are disposed at right angles to each other and at 45° with respect to the spindle axis. Strain gauges 140 and 141 are disposed in an identical fashion.

These strain gauges are connected in three bridge circuits which are balanced when the spindle deflection and torque are zero. With particular reference to FIG. 6, strain gauges 130–131, 134–135, and 132–133, 136–137 are connected in bridges 152, 153, and strain gauges 138–141 are connected in a bridge 151.

A power supply 150 is coupled via slip rings 95 and 106 to a node A of bridges 151–153 and a source of ground potential is likewise coupled via slip rings 95 and 106 to an opposite node C thereof. Suitable balancing networks couple the aforementioned nodes A and C, and opposite nodes B and D so that under conditions of zero deflection or zero torque, no output signal appears across nodes B and D.

Nodes B and D of each of the bridges 151–153 are connected via the slip rings 106, 95 and a connector 96 to the remainder of the sensor circuit 52. Specifically, node B of torque bridge 151 is coupled to a terminal 162c of a switch 162, and node D is coupled to a terminal 162a of switch 162. Node B of bridge 152 is coupled to a terminal 162d, and node D of bridge 152 is coupled to a terminal 162b. Movable arms 162e and 162f of switch 162 are coupled to the inputs of a differential amplifier 164. By this arrangement, a portion of the sensor circuit may be used for either torque or deflection measurement.

Nodes B and D of bridge 153 are likewise connected to the inputs of a second differential amplifier 168. Any output signals obtained from amplifiers 164 and 168 represent, respectively, the unbalanced bridge voltages obtained from bridges 151 or 152 and bridge 153. In the case of the deflection bridges 152 and 153, these outputs are directly proportional to the spindle deflection along the spindle diameter on which the corresponding strain gauges are placed. In the case of the torque bridge 151, this output is directly proportional to spindle torque.

The output signal from amplifier 164 is coupled by a switch 166 wither to a third switch 186 or to a squaring and square root circuit. Switches 166 and 186 are mechanically linked with switch 162 so that when the latter is thrown to connect movable arms 162e and 162f with the output from the torque bridge 151, switches 166 and 186 likewise connect the output of amplifier 164 directly to the input of a common output amplifier 188.

In the other position of switch 162, switches 166 and 186 apply the output signal of amplifier 164 to the squaring and square root circuitry. In this mode, the output of amplifier 164 is coupled to the parallel combination of a resistor 172 and a varistor 173. Likewise, the output of amplifier 168 is coupled to the parallel combination of a resistor 176 and a varistor 177. The aforementioned parallel combinations are connected to the input of a square root circuit by resistors 174 and 178.

The parallel connection of a varistor and resistor is a well-known circuit which provides squaring of an input signal. It may be desirable, in some embodiments of this invention, to square the deflection signals so that more emphasis is placed upon large deflections than upon small ones. In this manner, the system is caused to respond rapidly to large milling forces, while ignoring smaller forces normal in the milling process.

The square root circuit comprises an operational amplifier 180 which has connected in its feedback loop a series connection of a resistor 182 and a parallel-connected resistor 184 and varistor 185. This feedback connection is also well known in the art for providing the square root of an input signal applied thereto. In the present embodiment, this input signal comprises the sum of the two squared deflection signals. Accordingly, the output signal from the square root circuit is proportional to the resultant side load exerted on the spindle, as can be seen from the following equation:

$$f = k_3 \sqrt{(k_1 s_1)^2 + (k_2 s_2)^2}$$

where, $f$ = resultant force,
$s_1$ = output from strain gauge bridge 152,
$s_2$ = output from strain gauge bridge 153, and
$k_1, k_2, k_3$ = scaling constants provided by sensor circuit 52.

The output of this square root circuit is applied via switch 186 to the input of common output amplifier 188 which supplies a proportional milling force signal to the summing junction 42 of FIG. 2.

After the error signal, either positive or negative, is determined by comparison of the resultant force signal $f$ with the reference force signal $f_o$ in summing junction 42, feedrate controller 44 must modify the machine's feedrate in accordance therewith. Although perhaps an infinite number of control functions could be used in controller 44, there are a number of important criteria. Perhaps the most important of these is a requirement that peak milling forces on the cutter be limited to a value roughly approximating that of the reference force. If the dynamic range of milling force variation is large, the operation of any feedrate control system will not serve to significantly reduce cutter breakage and wear. It has been found experimentally that an integral control system successfully maintains average cutter force equal to the reference force, and peak cutter force to about twice the reference force for all selected feedrates.

An integral control function that has been implemented comprises the following:

$$V = V_o + K \int (f_o - f) |f_o - f| \, dt$$

where, $V$ = command feedrate,
$V_o$ = pre-set feedrate,
$K$ = gain constant,
$f_o$ = reference force, and
$f$ = resultant force.

With a control function of this type, feedrate is gradually increased whenever the resultant force $f$ is lower than the reference force $f_o$ and is gradually decreased whenever the resultant force $f$ exceeds $f_o$. With particular reference to FIG. 7, the control function is shown implemented in block diagram form by means of an absolute value circuit 190, a multiplier circuit 194, and an amplifier and integrator circuit 196. The output of the amplifier and integrator 196 comprises a desired average feedrate which is supplied to the machine block 46. Any milling machine and milling process has an inherent time constant. Therefore, although the actual feedrate signal supplied to the feed table motor could be varied instantaneously, actual feedrate does not change instantaneously because of the interaction between the cutting element and the workpiece. With functions of this type, the gain constant K of the amplifier and integrator 196 must be correctly chosen to determine the acceleration of feedrate increase or deceleration of feedrate decrease.

Under conditions of no end or side load on the cutting element, the output signal from amplifier and integrator circuit 196 would gradually increase to an infinite feedrate. In practice, this would mean that if the cutting element were advancing towards the workpiece and the feedback loop were not closed, the feedrate would increase to a value which, at collision, might result in destruction of the cutting element, workpiece, and elements of the milling machine. Therefore, a second input is provided to circuit 196 which defines a feedrate limit. In cases where the system is used as a feedrate override with an N/C unit, this input is obtained from the pre-programmed N/C tape and comprises the pre-set feedrate recorded thereon. With this system, the feedrate is equal to the pre-set rate whenever the cutting element is not in engagement with the workpiece and the resultant force thereon is zero.

The integral control function also filters out maximum and minimum peak force variations resulting from the alternate engagements and disengagements of the cutting element teeth and the workpiece.

Experimental and production tests with the automatic feedrate control system of this invention have verified that a large increase in average feedrate can be obtained without damage or undue wear on the cutting element or milling machine. In a first test, the milling machine comprises a Sundstrand N/C3-11 Bed Mill, controlled by a Bunker-Ramo N/C unit. An initial test was designed to test system response to a collision between the cutting element and a large steel mass mounted on the feed table. A 1.25 inch diameter endmill cutter was mounted in a tool adapter and secured to the spindle adapter illustrated in FIG. 4. A numerical control tape was pre-programmed for 20 inches per minute feed rate. After the machine was turned on and the spindle placed in a rotating condition, the feed table was directed on a collision path with the end-mill cutter at the pre-programmed feedrate. After approximately 2 inches of free travel, the cutter impacted the steel mass. In this case, the desired response of the automatic feedrate control system, a machine shut-off signal, occurred within 0.05 second. It appeared that the feed table traveled 0.06 inch between impact and shut-off. No damage to the cutting or milling machine was found.

In a second test, a 4340 normalized (150,000 p.s.i.) steel workpiece was profiled to an irregular configuration by conventional machining techniques. The workpiece was then mounted on the bed mill and the controller pre-programmed for a 20 inches per minute feedrate. Under control of an N/C tape, the workpiece was then machined to a flat plate. Past experience had shown that the standard, operator-controlled feedrate for this milling process was 5 inches per minute. With the automatic feedrate control system in use, actual feedrate varied between 5 inches per minute and 17 inches per minute. No undue cutter wear or breakage was observed, and a 55 percent reduction of machining time was obtained over the previous efforts.

Although this invention has been described with respect to a particular embodiment, it must be fully understood by those skilled in the art that the invention is not limited thereto. For example, a capacitive milling force sensor might well be used in some embodiments of the system. Also, some of the newer numerically-controlled milling machines do not use the cutter draw bar and tool adapter arrangement, but rather include a collet chuck disposed on the end of the spindle into which cutting tool is inserted. In this case, strain gauges such as those illustrated in FIG. 5 may be permanently mounted on the spindle. In certain cases, since the deflection and torque applied to the spindle by engagement of the cutting element with the workpiece are in some measure transmitted through the machine to the machine housing, such as cutter mechanism 28, it is contemplated that strain gauges or other suitable means be disposed directly on the machine housing.

If the sensing elements are disposed on or in contact with the spindle, arrangements other than mechanical slip rings may well be used for coupling power to the sensing elements and electrical output signals to the remainder of the sensor circuit. Included in this category are non-contact systems of various types.

As also mentioned in the preceding portions of the specification, the control function used in the feedrate controller, as well as the specific circuit elements, may vary depending on the desired system dynamic response. Finally, this invention is intended for use with any milling machine in which a spindle parameter, such as deflection or torque, is measurable, and which affords an external control of the feedrate. Therefore, the scope of this invention is intended to be limited only by the bounds of the appended claims.

I claim:

1. A system for automatically controlling the feedrate of a milling machine which includes a rotatable spindle holding a cutting tool and which has an input allowing control of feedrate, comprising:
   a. sensor means measuring a given spindle parameter and producing therefrom a signal proportional to milling force exerted on the cutting tool during milling,
   b. means providing a reference force signal,
   c. means summing said reference force signal with said milling force signal to provide an error signal equal to the difference therebetween, and
   d. controller means producing from said error signal a control signal and including means coupling said control signal to the feedrate control input of the milling machine.

2. A system as recited in claim 1 wherein said spindle parameter measured by said sensor means comprises spindle deflection.

3. A system as recited in claim 2 wherein said spindle deflection is measured along directions perpendicular to the axis of the spindle.

4. A system as recited in claim 1 wherein said spindle parameter measured by said sensor means comprises spindle torque.

5. A system as recited in claim 1 wherein said controller means operates on said error signal with a predetermined, integral control function so that said control signal represents a desired average feedrate of the machine.

6. A system for use with a numerically controlled milling machine which includes a rotatable spindle holding a cutting tool adapted for engagement with a workpiece and a numerical control unit which includes apparatus for receiving a pre-programmed tape defining the details of a milling process, one of these details being a pre-set feedrate, and which further includes a feedrate override means controllable to modify the feedrate from value, pre-set value comprising:
   a. sensor means measuring a given spindle parameter and producing therefrom a signal proportional to milling force exerted on the cutting element during the milling process,
   b. circuit means providing a reference force signal,
   c. means summing said reference force signal with said milling force signal to provide an error signal equal to the difference therebetween,
   d. a controller means producing a control signal from said error signal when said milling force signal differs from said reference force signal, and
   e. means coupling said control signal to the feedrate override means to modify feedrate in proportion thereto.

7. A system as recited in claim 6 wherein said spindle parameter measured by said sensor means comprises spindle deflection.

8. A system as recited in claim 7 wherein said spindle deflection is measured along directions perpendicular to the spindle axis.

9. A system as recited in claim 6 wherein said spindle parameter measured by said sensor means comprises spindle torque.

* * * * *

PO-1050
(5/69)

UNITED STATES PATENT OFFICE
CERTIFICATE OF CORRECTION

Patent No. 3,728,535                    Dated  April 17, 1973

Inventor(s)   Lyle C. Adams

It is certified that error appears in the above-identified patent and that said Letters Patent are hereby corrected as shown below:

Claim 5, line 9, change "value, pre-set value"

to -- the pre-set value, --

Signed and sealed this 27th day of November 1973.

(SEAL)
Attest:

EDWARD M. FLETCHER, JR.                RENE D. TEGTMEYER
Attesting Officer                      Acting Commissioner of Patents